United States Patent [19]

Freiberg et al.

[11] Patent Number: 4,609,486
[45] Date of Patent: Sep. 2, 1986

[54] SILICONE WATER-BASED EMULSIONS HAVING IMPROVED SHELF LIFE

[75] Inventors: Alan L. Freiberg; Daniel Graiver; Thomas F. Lim, all of Midland; Antony P. Wright, Rhodes, all of Mich.

[73] Assignee: Dow Corning Corporation, Midland, Mich.

[21] Appl. No.: 704,976

[22] Filed: Feb. 25, 1985

[51] Int. Cl.$^4$ .................... B01J 13/00; C08L 83/06; C09D 5/34
[52] U.S. Cl. ................ 252/310; 106/287.14; 252/312; 524/863
[58] Field of Search .............. 252/312, 310; 106/287.14; 524/863

[56] References Cited

U.S. PATENT DOCUMENTS

| | | | |
|---|---|---|---|
| 3,294,725 | 12/1966 | Findlay et al. | 524/745 |
| 3,634,285 | 1/1972 | Brooks | 252/312 |
| 4,221,688 | 9/1980 | Johnson et al. | 260/29.2 M |
| 4,244,849 | 1/1981 | Saam | 260/29.2 M |
| 4,370,252 | 1/1983 | Uraneck et al. | 252/312 X |

OTHER PUBLICATIONS

J. C. Saam et al.: "Room-Temperature-Cured Polydimethylsiloxane Elastomers from Aqueous Dispersion", Rubber Chemistry and Technology, vol. 54, No. 5, Nov.-Dec. 1981, pp. 976-987.

J. C. Saam et al.: "Condensation Polymerization of Oligomeric Polydimethylsiloxanols in Aqueous Emulsion", Journal of Polymer Science: Polymer Chem. Edit., vol. 20, 3351-3368 (1982).

*Primary Examiner*—Richard D. Lovering
*Attorney, Agent, or Firm*—Edward C. Elliott

[57] ABSTRACT

The shelf life of an aqueous, anionic silicone emulsion, which contains an organic tin compound and which forms an elastomer upon removal of the water, is improved by the addition of an additive. The additive is selected from the group consisting of alkyl mercaptan, 8-quinolinol, thioglycolic acid, and salts of thioglycolic acid. Elastomers produced by removing the water from these emulsions, once shelf aged, have more consistent physical properties than do elastomers produced from similar emulsions not containing the additives.

16 Claims, No Drawings

SILICONE WATER-BASED EMULSIONS HAVING IMPROVED SHELF LIFE

BACKGROUND OF THE INVENTION

1. Field of Invention

This invention relates to aqueous anionic silicone emulsions which cure to elastomers upon removal of the water and which contain a tin compound as a catalyst.

Background Information

A group of aqueous anionic silicone emulsions have been developed which yield elastomers upon removal of the water from the emulsion. Some of these compositions contain a tin compound as a catalyst. It has now been found that the properties of such emulsions containing a tin compound vary as the composition ages. In particular, the elongation of the elastomer produced by removing the water tends to decrease as the emulsion ages after its manufacture.

In U.S. Pat. No. 4,221,688, issued Sept. 9, 1980, Johnson et al. teach a silicone emulsion having a dispersed phase of an anionically stabilized hydroxylated polydiorganosiloxane and a colloidal silica and a continuous phase of water in which the pH is 9 to 11.5. Upon removal of the water at ambient conditions, an elastomeric product such as a film or coating is produced. A period of time is required during which the polydiorganosiloxane and colloidal silica interact to form a composition which gives an elastomer upon removal of the water. The required time is lowered from a period such as 5 months to a period of a few days by the use of an organic tin compound, preferably a diorganotindicarboxylate.

In U.S. Pat. No. 4,244,849, issued Jan. 13, 1981, Saam teaches an aqueous silicone emulsion which provides an elastomeric product upon removal of the water under ambient conditions. The emulsion comprises a continuous water phase and an anionically stabilized dispersed silicone phase which is a graft copolymer of a hydroxyl endblocked polydiorganosiloxane and an alkali metal silicate. An organic tin compound can be employed to accelerate the formation of the graft copolymer.

SUMMARY OF THE INVENTION

This invention is directed to a method of improving the shelf life of aqueous anionic silicone emulsions which contain an organic tin compound as a catalyst. The present invention is to add from 1 to 40 mols, per mol of organic tin compound, of an additive selected from the group consisting of alkyl mercaptan in which the alkyl group contains from 3 to 15 carbon atoms, 8-quinolinol, thioglycolic acid, and salts of thioglycolic acid to such a silicone emulsion. The physical properties of the elastomer produced from this improved emulsion, by removal of the water, are more consistent than those obtained from similar emulsions which do not contain the additive.

It is an object of this invention to produce an improved aqueous anionic silicone emulsion which yields an elastomeric product, upon removal of the water from the emulsion, having physical properties which do not change excessively during aging of the emulsion.

It is an object of this invention to produce an improved aqueous anionic silicone emulsion which is useful as a caulking material.

DESCRIPTION OF THE INVENTION

This invention relates to a method of improving the shelf life of an anionic silicone emulsion consisting essentially of (A) preparing a curable anionic silicone emulsion of the type comprising a continuous aqueous phase and a dispersed polydiorganosiloxane phase in which an organic tin compound is used as a catalyst, (B) aging the composition of (A) until the emulsion is capable of yielding an elastomer upon removal of water from the emulsion, then (C) admixing from 1 to 40 mols, per mol of organic tin compound, of an additive selected from the group consisting of alkyl mercaptan in which the alkyl group contains from 3 to 15 carbon atoms, 8 quinolinol, thioglycolic acid, and salts of thioglycolic acid to give an anionic silicone emulsion which yields an elastomeric product upon removal of the water at room temperature.

Aqueous anionic silicone emulsions have been developed which yield elastomers upon removal of the water. Some of these emulsions use an organic tin catalyst, to accelerate the formation of a composition which will yield an elastomer upon removal of the water, so that production of these emulsions is commercially practical. Such catalyzed emulsions have been found to give elastomers having different physical properties, depending upon how long the emulsion has aged after manufacture before the elastomeric product is formed. In some cases, particularly with high solids emulsions useful as caulking materials, the change in properties is great enough so that the usefulness of the product becomes doubtful. For example, in a caulking material having an elongation shortly after manufacture of about 1100 percent, the elongation of the elastomer produced from an emulsion which had aged for 1 year at room temperature could be as little as 45 percent. It is preferred that the elongation of a caulking material be as high as possible so that the caulking material does not fail upon movement of the joint being sealed.

When a caulking material is used to seal a joint which moves, the amount of stress placed upon the bond between the caulking material and the substrate to which it is adhered is a function of the modulus of the caulking material. A caulking material with a low modulus stresses a bond to a lower degree than a material with a high modulus. In these silicone elastomers produced from aqueous emulsions, the modulus is inversely proportional to the elongation, that is, a high elongation material has a low modulus.

It has now been found that the aqueous anionic silicone emulsions that contain an organic tin catalyst can be stabilized after their manufacture by adding an additive which slows down the rate at which the emulsions change properties, in particular the amount of elongation change.

The curable anionic silicone emulsions useful in the method of this invention are those of the type comprising a continuous aqueous phase and a dispersed polydiorganosiloxane phase in which an organic tin compound is used as a catalyst.

One such emulsion is that described by Johnson et al. in U.S. Pat. No. 4,221,688, issued Sept. 9, 1980, which patent is hereby incorporated by reference to show curable anionic silicone emulsions which contain an organic tin compound and which cure to elastomers upon removal of the water at ambient temperatures and methods for their manufacture. The most preferred hydroxylated polydiorganosiloxanes are those prepared by the method of anionic emulsion polymerization described by Findley et al. in U.S. Pat. No. 3,294,725, issued Dec. 27, 1966, which is hereby incorporated by reference to show the methods of polymerization and to show the hydroxylated polydiorganosiloxane in emulsion.

Another curable anionic silicone emulsion useful in this invention is that described by Saam in U.S. Pat. No. 4,244,849, issued Jan. 13, 1981, which is hereby incorporated by reference to show curable anionic silicone emulsion, in which an organic tin compound is used and which cure to elastomers upon removal of the water under ambient conditions, and methods for their manufacture. An anionically stabilized aqueous emulsion of hydroxyl endblocked polydiorganosiloxane such as that taught by Findley et al. incorporated above, is admixed with alkali metal silicate, and organic tin salt, then adjusted to a pH of from 8.5 to 12. The emulsion is then aged for a time period such that an elastomeric product is formed upon removal of the water under ambient conditions.

After the anionic silicone emulsion containing an organic tin compound is aged until the emulsion is capable of yielding an elastomeric composition upon removal of the water from the emulsion, the additives disclosed above are admixed into the curable silicone emulsion. The additives include alkyl mercaptan in which the alkyl group contains from 3 to 15 carbon atoms. Alkyl radicals include propyl, hexyl, octyl, decyl, dodecyl, and pentadecyl, with octyl a preferred radical. A preferred mercaptan is t-octylmercaptan. Thioglycolic acid and salts of thioglycolic acid such as ammonium, sodium, potassium, and lithium salts are useful additives with ammonium being the preferred radical. Another useful additive is 8-quinolinol.

The minimum amount of additive is one mol of additive per mol of organic tin compound while the maximum is 40 mols of additive. The preferred additive is 10 to 30 moles of a salt of thioglycolic acid. The preferred salt of thioglycolic acid is ammonium thioglycolate in a preferred amount of from 10 to 20 mols of ammonium thioglycolate per mol of organic tin compound.

The method of this invention first prepares an anionic silicone emulsion which comprises a continuous aqueous phase and a dispersed phase of polydiorganosiloxane and an organic tin compound. The emulsion is of the type which provides an elastomeric product upon removal of the water from the emulsion after the emulsion has aged for a sufficient period of time. One method of preparing the emulsion is that taught in U.S. Pat. No. 4,221,688, incorporated herein, where a hydroxylated polydiorganosiloxane which contains about 2 silicon-bonded hydroxyls per molecule is emulsified using anionic surfactant and water. The preferred method for this step is that disclosed in U.S. Pat. No. 3,294,725, incorporated above, where an emulsion is prepared by emulsifying an organosiloxane in an aqueous medium in the presence of a compound of the formula $R'C_6H_4SO_3H$ wherein $R'$ is a monovalent aliphatic hydrocarbon radical of at least 6 carbon atoms until the desired increase in molecular weight is obtained. The preferred weight average molecular weight is above 50,000 with a range of from 200,000 to 700,000 most preferred. The method of '688 then adds a colloidal silica and an organic tin compound and adjusts the pH of the resulting emulsion to a pH within the range of from 9 to 11.5 inclusive. The emulsion is then aged for a period of time to allow reaction between the ingredients. When the organic tin compound is a diorganotindicarboxylate in an amount of from 0.1 to 2 part by weight for each 100 parts by weight of the hydroxylated polydiorganosiloxane, the time required is about 1 to 3 days. Longer periods of time, 3 to 14 days, for example, are also acceptable because once the ingredients have reacted together to the point when an elastomer is formed upon removal of water, the emulsion will continue to give an elastomer upon removal of the water.

Another method of preparing an anionic silicone emulsion for use in this invention is that taught in U.S. Pat. No. 4,244,849, incorporated above. Under this method, an aqueous silicone emulsion is prepared by adding alkali metal silicate and organic tin salt to anionically stabilized aqueous emulsion of hydroxyl endblocked polydiorganosiloxane, adjusting the pH of the emulsion within the range of from 8.5 to 12 inclusive and then aging the emulsion for a time period such that an elastomeric product is formed upon removal of the water under ambient conditions. A preferred anionically stabilized aqueous emulsion of hydroxyl endblocked polydiorganosiloxane is that produced by the method of '725 incorporated and discussed above. A preferred alkali metal silicate is the well-known and commercially available aqueous solutions of sodium or potassium silicate. A preferred organic tin salt is a diorganotindicarboxylate with dioctyltindilaurate most preferred. The organic tin salt is employed in an amount of from about 0.1 to 2 parts by weight for each 100 parts by weight polydiorganosiloxane to effectively reduce the aging period to commercially practical times.

The pH of the silicone emulsion is preferably adjusted to the defined range by admixing the appropriate amount of a basic compound such as an organic amine, an alkali metal hydroxide, or a combination thereof. Preferred amines are diethylamine and 2-amino-2-methyl-1-propanol. The preferred alkali metal hydroxide is sodium hydroxide.

The curable anionic emulsion is aged until the emulsion yields an elastomer upon removal of the water from the emulsion. This aging period can be at room temperature. With the organic tin compound present, the aging period at room temperature typically requires from about 1 to 3 days for sufficient reaction to take place so that an elastomer is formed upon removing the water. The reaction originally occurs at a rapid rate, then slows as the number of reactive sites becomes lower and lower. The reaction continues at a slow rate as the emulsion ages. This is evidenced by the gradual change in the physical properties of the elastomer formed by drying samples of the emulsion over a time period. The method of this invention prevents or slows down this later gradual change by admixing an additive into the emulsion after it has reacted sufficiently to be capable of giving the elastomer properties desired.

The additive is admixed into the emulsion to give a uniform mixture. The additive then reacts to prevent or slow down the reaction of the ingredients so that the physical properties of the elastomer produced are more consistent than when the additive is not used.

Emulsions produced following the method of this invention can also contain other ingredients such as thickeners, antifoam, fillers, pigments, and additives, such as heat stability additives, useful with silicone elastomers.

By admixing reinforcing and/or extending filler into the emulsion, the viscosity of the emulsion can be raised so that the product is a paste. A paste is herein defined as a uniform mixture having a viscosity high enough so that it does not flow when placed upon a surface and low enough so that it can be extruded from a storage container. Such a product is particularly useful as a caulking material. The emulsion is stored in the familiar sealed cartridge which prevents evaporation of the water. At the time of use, the cartridge is opened at the discharge nozzle and the emulsion extruded out into the space to be filled, such as a joint in a building. The emulsion, in paste form, will adhere to the sides of the films were cast and tested as for the original with the results as shown.

The t-dodecylmercaptan at a mol ratio of 2:1 based upon the tin compound was most efficient in retaining tensile strength upon aging while the 8-quinolinol was most efficient in retaining elongation at break upon aging. The 8-quinolinol turned the emulsion a brown color. The 5,6-dimethyl-3,6-diol-4-octene containing mixture gave a film upon drying when initially prepared which was rough and contained cracks. The t-octylmercaptan gave the mixture a very objectionable odor.

TABLE I

| Additive | Mole Ratio of Additive to DOTDL | Tensile Strength, MPa | | | Percent Retention | Elongation Percent | | | Percent Retention |
|---|---|---|---|---|---|---|---|---|---|
| | | Initial | 2 Month | 6 Month | | Initial | 2 Month | 6 Month | |
| None | None | 2.07 | 1.72 | 1.45 | 70 | 810 | 570 | 380 | 47 |
| 2,4-pentadione* | 2:1 | 1.93 | 1.58 | 1.38 | 71 | 800 | 600 | 350 | 44 |
| | 5:1 | 2.07 | 1.24 | 1.17 | 57 | 850 | 490 | 390 | 46 |
| 8-quinolinol | 2:1 | 2.20 | 1.79 | 1.17 | 53 | 790 | 790 | 750 | 95 |
| | 4.4:1 | 1.31 | 1.03 | 0.69 | 53 | 700 | 700 | 630 | 90 |
| 2,2'-bipyridine* | 2:1 | 2.00 | 1.72 | 1.31 | 66 | 800 | 570 | 400 | 50 |
| | 4.4:1 | 2.07 | 0.93 | 0.83 | 40 | 850 | 530 | 370 | 44 |
| t-dodecylmercaptan | 2:1 | 1.86 | 2.20 | 1.93 | 100 | 740 | 700 | 490 | 64 |
| | 5:1 | 1.93 | 2.00 | 1.45 | 75 | 840 | 650 | 390 | 46 |
| t-octylmercaptan | 2:1 | 2.20 | 2.07 | 1.24 | 56 | 840 | 600 | 370 | 44 |
| | 5:1 | 2.20 | 2.34 | 1.86 | 84 | 800 | 750 | 640 | 80 |
| 5,6-dimethyl-3,6-diol-4-Octene* | 1.66:1 | 1.31 | 1.31 | 0.90 | 68 | 500 | 550 | 350 | 70 |
| | 3.32:1 | 1.65 | 0.96 | 0.76 | 46 | 740 | 570 | 270 | 36 |

*comparative examples
DOTDL = dioctyltindilaurate space and not flow out of the joint. The water then evaporates, leaving an elastomer bonded to the sides of the joint. In such applications, it is desirable that the elastomer have a high elongation and low modulus so that the bond to the sides of the joint is not stressed excessively upon movement of the joint. The emulsion of this invention is particularly useful because the elongation and modulus of the elastomer produced changes at a much slower rate upon shelf aging of the emulsion than do elastomers produced from similar emulsions without the additive.

The following examples are presented for purposes of illustrating this invention and should not be construed as limiting the scope of the invention which is properly delineated in the claims.

EXAMPLE 1

An anionically stabilized emulsion of silanol terminated high molecular weight polydimethylsiloxane was prepared and neutralized to a pH of 10.75 with ethylenediamine. This emulsion was formulated with 1 part by weight of dioctyltindilaurate and 10 parts by weight of colloidal silica per 100 parts by weight of hydroxyl endblocked polydimethylsiloxane. The colloidal silica was present as a 15 percent by weight solids anionic colloidal silica sol in which the silica particles have an average diameter of about 4 nanometres and a surface area of about 750 m$^2$/g.

Portions of the catalyzed emulsion were then mixed with the compounds shown in Table 1 in the amounts shown. A portion of each sample was then cast into a film and dried for 14 days. Test samples were cut from the films and at least four tests were performed for each film and the results averaged. The tensile strength and elongation were measured at a strain rate of 500 mm/min (20 inches per minute) with the results for tensile strength and elongation at break as shown in Table 1.

The catalyzed emulsions mixed with the compounds were then shelf aged. At the periods shown in Table 1,

EXAMPLE 2

A curable anionic silicone emulsion was prepared by mixing 172 parts of emulsion containing 100 parts of hydroxyl endblocked polydimethylsiloxane with 8 parts of anionic colloidal silica sol having 50 percent by weight of colloidal silica with a particle size of about 20 nanometres and a surface area of about 150 m$^2$/g, 2 parts of dibutyltindilaurate and 4 parts of 2-amino-2-methyl-1- propanol. This emulsion was aged 7 days at room temperature, then a portion of the emulsion was mixed with 2.5 parts of t-octylmercaptan. After 7 days more, both portions were compounded into a sealant material by mixing in 5 parts of a 76 percent solids slurry of finely divided titanium dioxide, 1 part of an acrylic thickening agent and 150 parts of finely divided calcium carbonate filler.

Samples of each caulking material were formed into a sheet, dried, and tested for elongation. The results are shown in Table II, along with the results obtained after the caulking materials were aged for 6 months and for 1 year at room temperature and then tested in the same manner.

The caulking material without the mercaptan lost essentially all of its elongation, while that having the mercaptan retained its elongation.

TABLE II

| Aging Time | Percent Elongation | | |
|---|---|---|---|
| | None | 6 Months | 1 Year |
| control | 1155 | 188 | 45 |
| with mercaptan | 826 | 917 | 869 |

EXAMPLE 3

A series of additives were screened by adding them to a curable anionic silicone emulsion containing about 100 parts of hydroxyl endblocked polydimethylsiloxane, 4 parts of colloidal silica, 0.13 part of tin compound, antifoam, freeze-thaw stabilizer, titanium dioxide pigment, thickener, and amine, the emulsion having a solids content of about 59 percent by weight. The mol ratio of additive to tin compound was either 2:1 or 5:1 as shown in Table III. These mixtures were than converted to caulking materials by mixing in about 110 parts of finely ground calcium carbonate filler per 100 parts of polydimethylsiloxane. Each caulking material was formed into a sheet, dried, and made into test pieces and tested with the results shown in Table III. The thioglycolic acid and ammonium thioglycolate at the 5:1 mol ratio of additive to tin compound maintained the elongation on aging most effectively.

TABLE III

| Additive | Mole Ratio of Additive to DOTDL | Tensile Strength, MPa Initial | Elongation Percent | | |
|---|---|---|---|---|---|
| | | | Initial | 6 Month | 1 Year |
| None | — | 0.94 | 1033 | 493 | 309 |
| trimethylpropane | 2:1 | 0.99 | 1415 | 525 | 409 |
| tri-3-mercapto-propionate | 5:1 | 0.76 | 1344 | 498 | 456 |
| thioglycolic acid, 80% | 2:1 | 0.75 | 1377 | 558 | 450 |
| | 5:1 | 0.52 | 1073 | 676 | 622 |
| ammonium thioglycolate | 2:1 | 0.67 | 1245 | 581 | 497 |
| | 5:1 | 0.43 | 939 | 811 | 619 |
| thiosalicylic acid* | 2:1 | 0.96 | 1318 | 556 | 412 |
| | 5:1 | 1.00 | 1400 | 533 | 425 |
| t-octylmercaptan | 2:1 | 0.93 | 1387 | 497 | 469 |
| | 5:1 | 0.95 | 1382 | 612 | 491 |
| Na$_2$S in water* | 2:1 | 0.86 | 1342 | 451 | 419 |
| | 5:1 | 0.83 | 1405 | 490 | 400 |
| triethanol amine* | 2:1 | 1.03 | 1135 | 488 | 391 |
| | 5:1 | 1.01 | 1139 | 584 | 424 |

*Comparative examples

EXAMPLE 4

Different levels of ammonium thioglycolate were added to the curable anionic emulsion of Example 3 in the mol ratios to tin compound shown in Table IV and then the mixtures were made into caulking materials as in Example 3. Each caulking material was formed into a sheet, dried, and made into test pieces and tested for physical properties as shown in Table IV. Measurements were made in accordance with ASTM D2240 for durometer, ASTM D412 for tensile strength and elongation, and ASTM D624 for tear strength. The adhesion to glass was measured by applying a 1.5 mm thickness of the caulking material to a clean glass panel, then embedding an aluminum screen into the top of the caulking material and applying a layer of caulking material over the screen, then drying for 14 days. The reinforced caulk is cut into 25.4 mm wide strips and then peeled off the glass at a 180° angle at a rate of 50 mm per minute. The load required is the peel strength.

As the amount of ammonium thioglycolate is increased, the stability of the emulsion increases as measured by the elongation. Above a ratio of 20:1 for the ammonium thioglycolate, an odor is noticed. The caulking material has a blue to purple cast as it is first exposed to the air; the color disappears as the caulking material dries.

TABLE IV

| Ratio of ATG to Tin Compound | Durometer Shore A | Tensile Strength MPa | Elongation percent | Tear Strength kN/m | Peel Strength kN/m |
|---|---|---|---|---|---|
| none | 35 | 1.30 | 1251 | 8.2 | 3.7 |
| 5:1 | 27 | 0.80 | 1147 | 6.3 | 4.0 |
| 10:1 | 22 | 0.65 | 1330 | 4.6 | 3.7 |

TABLE IV-continued

| Ratio of ATG to Tin Compound | Durometer Shore A | Tensile Strength MPa | Elongation percent | Tear Strength kN/m | Peel Strength kN/m |
|---|---|---|---|---|---|
| 20:1 | 20 | 0.54 | 1266 | 3.7 | 4.2 |
| 40:1 | 20 | 0.47 | 1289 | 3.3 | 3.9 |
| after aging 9 months at room temperature | | | | | |
| none | 37 | 1.00 | 434 | 8.2 | 1.6 |
| 5:1 | 34 | 0.92 | 612 | 7.4 | 2.8 |
| 10:1 | 30 | 0.91 | 834 | 7.2 | 3.0 |
| 20:1 | 24 | 0.84 | 958 | 6.1 | 3.9 |
| 40:1 | 21 | 0.72 | 1057 | 5.6 | 3.7 |

ATG = ammonium thioglycolate

That which is claimed is:

1. A method of improving the shelf life of an anionic silicone emulsion consisting essentially of
   (A) preparing a curable anionic silicone emulsion of the type comprising a continuous aqueous phase and a dispersed polydiorganosiloxane phase in which an organic tin compound is used as a catalyst,
   (B) aging the composition of (A) until the emulsion is capable of yielding an elastomer upon removal of water from the emulsion, then
   (C) admixing from 1 to 40 mols, per mol of organic tin compound, of an additive selected from the group consisting of alkyl mercaptan in which the alkyl group contains from 3 to 15 carbon atoms, 8 quinolinol, thioglycolic acid, and salts of thioglycolic acid,
to give an anionic silicone emulsion which yields an elastomeric product upon removal of the water at room temperature.

2. The method of claim 1 in which the anionic silicone emulsion of (A) comprises a continuous aqueous phase and a dispersed phase, the dispersed phase consisting essentially of an anionically stabilized hydroxylated polydiorganosiloxane which contains about 2 silicon-bonded hydroxyls per molecule, an organic tin compound, and a colloidal silica, said silicone emulsion having a pH in a range of 9 to 11.5 inclusive.

3. The method of claim 2 in which the aging period (B) is from 1 to 3 weeks at room temperature.

4. The method of claim 3 in which from 10 to 30 mols of salt of thioglycolic acid are admixed in (C).

5. The method of claim 4 in which the salt of thioglycolic acid is ammonium thioglycolate.

6. The anionic silicone emulsion having improved shelf life, produced by the method of claim 5.

7. The method of claim 5 in which from 10 to 20 mols of ammonium thioglycolate are admixed in (C).

8. The method of claim 7 in which sufficient filler is admixed to yield a paste.

9. The paste-type emulsion of claim 8.

10. The method of claim 1 in which the anionic silicone emulsion of (A) comprises a continuous water phase and an anionically stabilized dispersed silicone phase free of colloidal silica, the silicone phase comprising a graft copolymer of alkali metal silicate and a hydroxyl endblocked polydiorganosiloxane, the silicone emulsion having a pH within the range of from 8.5 to 12 inclusive and having present an organic tin salt.

11. The anionic silicone emulsion, having improved shelf life, produced by the method of claim 1.

12. A composition obtained by combining (A) a curable, anionic silicone emulsion of the type comprising a continuous aqueous phase and a dispersed polydiorganosiloxane phase in which an organic tin compound is used as a catalyst, said emulsion having been aged until capable of yielding an elastomer upon removal of the water from the emulsion, and (B) from 1 to 40 mols, per mol of organic tin compound, of an additive selected from the group consisting of alkyl mercaptan in which the alkyl group contains from 3 to 15 carbon atoms, 8-quinolinol, thioglycolic acid, and salts of thioglycolic acid.

13. The composition of claim 12 in which the anionic silicone emulsion of (A) comprises a continuous aqueous phase and a dispersed phase, the dispersed phase consisting essentially of an anionically stabilized hydroxylated polydiorganosiloxane which contains about 2 silicon-bonded hydroxyls per molecule, an organic tin compound, and a colloidal silica, said silicone emulsion having a pH in a range of 9 to 11.5 inclusive.

14. The composition of claim 12 in which the anionic silicone emulsion of (A) comprises a continuous water phase and an anionically stabilized dispersed silicone phase free of colloidal silica, the silicone phase comprising a graft copolymer of alkali metal silicate and a hydroxyl endblocked polydiorganosiloxane, the silicone emulsion having a pH within the range of from 8.5 to 12 inclusive and having present an organic tin salt.

15. The composition of claim 12 in which (B) is from 10 to 20 mols of ammonium thioglycolate.

16. The composition of claim 12 in which sufficient filler is admixed to yield a paste.

* * * * *